Aug. 14, 1962 R. L. RILEY 3,049,624
RETRIGGERABLE MEMORY
Filed March 25, 1960
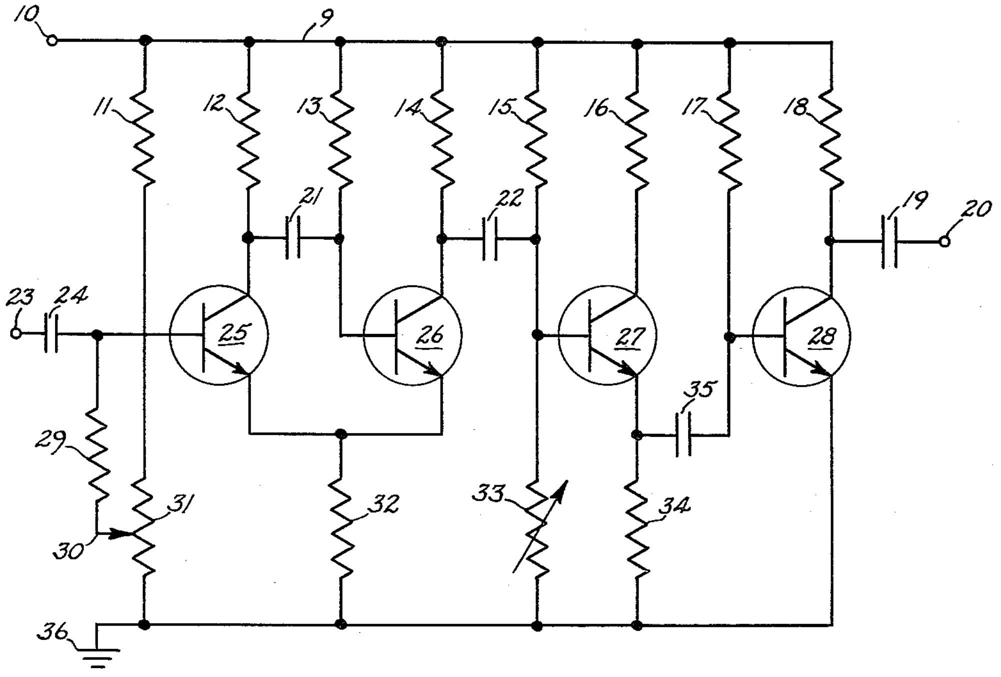
INVENTOR.
ROBERT L. RILEY
BY
H. H. Losche
ATTORNEYS

3,049,624
RETRIGGERABLE MEMORY

Robert L. Riley, Levittown, N.J., assignor, by mesne assignments, to the United States of America as represented by the Secretary of the Navy Filed Mar. 25, 1960, Ser. No. 17,714
11 Claims. (Cl. 307—88.5)

This invention relates to pulse producing circuits in general and more specifically to circuits capable of producing pulses of a definite duration in response to trigger pulses regardless of the time of input of the trigger pulse. In the art there are numerous circuits for producing pulses in response to trigger pulses. However, there has been a need for circuits which can produce a pulse output which is in response to a trigger input signal and which has a duration or pulse width independent of the time of occurrence of the trigger input signal. A conventional one-shot multivibrator is inadequate for this purpose. It cannot be triggered during the "on" time, and if triggered immediately following the "on" time, during the recovery time, will produce a new pulse having a shorter pulse width than specified. Circuitry capable of producing an output pulse having a duration independent of the time of occurrence of the input is useful in indicator units and as a gating source in various applications of pulse circuitry, particularly in the automatic indicator field.

In a typical embodiment of the present invention, there is an emitter coupled monostable multivibrator circuit having an input for trigger pulses and having an output coupled to an emitter follower. The emitter follower is in turn coupled to a storage device which is charged through the emitter follower during the operation of the multivibrator in its unstable state (multivibrator "on" time). The storage device is coupled to the base of an output amplifier which conducts normally during the charging of the storage device. At the end of the unstable state of the multivibrator, the charging of the storage device ceases and conduction through the output amplifier is cut off producing an output pulse at the output of the amplifier. This output pulse then remains for a predetermined time until the storage device has discharged.

It is therefore an object of this invention to provide a pulse producing circuit which can produce an output signal in response to a trigger input signal and having a duration independent of the time of occurrence of the trigger input signal. It is another object of this invention to provide a pulse of a predetermined width for each input signal regardless of the time of occurrence of said input signal.

Other objects and features of the invention will become apparent to those skilled in the art as the disclosure is made in the following detailed description of a preferred embodiment of the invention which is illustrated in the accompanying single FIGURE of drawing.

In the illustrated embodiment there is shown a multivibrator circuit which has a first transistor 25 of the N-P-N type with its collector connected through resistance 12 to a supply line 9 to which a source of potential can be coupled at terminal 10. The base of transistor 25 is coupled through capacitor 24 to input terminal 23 for trigger pulses. An adjustable base potential for transistor 25 is provided by the coupling of the base through resistor 29 and the movable tap 30 of the potentiometer 31 which is connected in series with resistance 11 across the source of supply which is available between input terminal 10 and the terminal 36 which may be, for this example, a ground. The emitter of transistor 25 is connected through resistance 32 to ground. The multivibrator also includes transistor 26 which is of the N-P-N type and which has a collector coupled through resistance 14 to the supply line 9. The emitter of transistor 26 is connected in common with the emitter of transistor 25. The base of transistor 26 is coupled through capacitor 21 to the collector of transistor 25, and is further coupled through resistance 13 to the supply line 9. The multivibrator output is produced through coupling capacitor 22 to the common junction between resistance 15 and variable resistance 33 which resistances are connected in series across the source of supply between supply line 9 and ground 36. Transistor 27 having a collector coupled through resistance 16 to supply line 9 and an emitter coupled through resistance 34 to ground, has an output from its emitter through capacitor 35 establishing it in an emitter follower function. The capacitor 35 is coupled to the base of transistor 28 having a collector coupled through resistor 18 to supply line 9 and an emitter connected to ground 36. The base of transistor 28 is also connected to supply line 9 through resistance 17. An output for the invention is provided from the collector of transistor 28 through capacitor 19 to terminal 20.

*Operation*

In the operation of the embodiment shown, transistor 26 is normally conducting with transistor 25 turned off. Upon the impression of a trigger signal of positive polarity at the input terminal 23, transistor 25 is turned on causing a drop in the potential at its collector due to the increase in current through resistance 12 according to conventional multivibrator operation. The drop in the potential at the collector of transistor 25 is coupled across capacitor 21 which, because it cannot discharge instantaneously, produces the effect of dropping the potential on the base of transistor 26 turning it off. When transistor 26 is turned off and transistor 25 is conducting the multivibrator begins operating in its unstable or "on" state. The turning off of transistor 26 causes its collector potential to rise and produce a positive pulse through capacitor 22 to the base of emitter follower 27. The positive pulse on the base of emitter follower 27 causes it to conduct heavily and initiates charging of the storage capacitor 35. This applies a strong forward bias on transistor 28, and capacitor 35 charges through transistors 27 and 28. At the end of the unstable state of the multivibrator when capacitor 21 has been charged through resistor 13, transistor 26 is turned on producing a drop in its collector potential. This drop is conducted through capacitor 22 to the base of emitter follower 27 and the charging of capacitor 35 ceases. At this instant the capacitor 35 begins to discharge through resistors 17 and 34 whereupon a drop in potential at the base of transistor 28 occurs, cutting it off. This is reflected by a rise in potential at its collector. The rise in potential at its collector coupled through capacitor 19 constitutes an output pulse at terminal 20. The output pulse at terminal 20 continues to exist as long as capacitor 35 continues to discharge and as long as no new positive trigger pulse is impressed at terminal 23.

If a trigger pulse is applied to terminal 23 during operation of the multivibrator in its stable state but before discharge of capacitor 35 is complete, the multivibrator is placed in its unstable state and the charging of capacitor 35 through resistors 27 and 28 is reinstated in normal fashion. This causes a momentary interruption of the output pulse produced in response to the last previous trigger pulse. However, when the unstable state of the multivibrator ceases, discharge of capacitor 35 again takes place at the same rate as it would if it had discharge as a result of the previous trigger pulse so that a new pulse is produced at the output 20. This pulse is of the same duration as the one initiated by the previous trigger pulse would have been if it had not been interrupted.

It should be understood, of course, that the foregoing disclosure relates to only a preferred embodiment of the invention and that numerous modifications and alterations may be made therein without departing from the spirit and the scope of the invention as set forth in the appended claims.

What is claimed is:

1. A retriggerable memory circuit comprising: a pulse producing means having an input for trigger signals and an output thereof coupled to low impedance means for developing a pulse of short duration in response to each of said trigger signals; charge storage means coupled to said low impedance means for receiving a charge initiated by said pulse of short duration; control means coupled to said low impedance means for controlling the duration of charge and discharge of said charge storage means; and an output means coupled to said control means to provide an output pulse during discharge of said charge storage means independent of said pulse of short duration thus enabling said retriggerable memory circuit to be responsive to the most recent of said trigger signals, regardless of the time of its occurrence with respect to any previously initiated output pulse, for developing an output pulse of predetermined width at said output means.

2. A retriggerable memory circuit comprising: a one-shot multivibrator having an input for trigger signals and an output thereof coupled to low impedance means for developing a pulse of short duration in response to each of said trigger signals; charge storage means coupled to said low impedance means for receiving a charge initiated by said pulse of short duration; control means coupled to said low impedance means for controlling the duration of charge and discharge of said charge storage means; and an output means coupled to said control means to provide an output pulse during discharge of said charge storage means independent of said pulse of short duration whereby the state of operation of said multivibrator is independent of the state of completion of any output pulse from said output means thus enabing said retriggerable memory circuit to be responsive to the most recent of said trigger signals, regardless of the time of its occurrence with respect to any previously initiated output pulse, for developing an output pulse of predetermined width at said output means.

3. A retriggerable memory circuit comprising: an input for trigger signals; a pulse producing circuit coupled to said input for developing a pulse of short duration in response to each of said trigger signals; means coupling said pulse producing circuit to a charge-discharge circuit to enable said charge-discharge circuit to receive a charge initiated by said pulse of short duration; and output means coupled to said charge-discharge circuit and operated thereby for producing an output pulse during discharge of said charge-discharge circuit independent of said pulse of short duration thereby enabling said retriggerable memory circuit to be responsive to the most recent of said trigger signals, regardless of the time of its occurrence with respect to any previously initiated output pulse, for developing an output pulse of predetermined width at said output means.

4. A retriggerable memory circuit comprising: a pulse producing circuit coupled to an input for trigger signals to produce pulses of short duration in response to trigger signals; charge-discharge circuit means coupled to said pulse producing circuit to accumulate a charge initiated by said pulse of short duration; means coupled to said charge-discharge circuit and to a source of supply and having an output and operable by said charge-discharge circuit to provide an output pulse during discharge of said charge-discharge circuit independent of said pulse of short duration thus enabling said retriggerable memory circuit to be responsive to the most recent of said trigger signals, regardless of the time of its occurrence with respect to any previously initiated output pulse, for developing an output pulse of predetermined width at said output.

5. A retriggerable memory circuit comprising: a pulse producing circuit coupled to an input for trigger signals to produce pulses of short duration having a uniform amplitude and width in response to trigger signals; storage means coupled through coupling circuits to said pulse producing circuit to accumulate a charge initiated by said pulse of short duration; a storage means discharging circuit coupled to said storage means; means coupled to said storage means and operable by the charge thereon and coupled across a source of supply and having an output means coupled thereto whereby an output pulse is produced during discharge of said storage means independent of said pulse of short duration thus enabling said retriggerable memory circuit to be responsive to the most recent of said trigger signals, regardless of the time of its occurrence with respect to any previously initiated output pulse, for developing an output pulse of predetermined width at said output means.

6. A retriggerable memory circuit comprising: a multivibrator circuit coupled to an input for trigger signals to produce pulses having a uniform amplitude and width in response to trigger signals; storage means coupled through coupling circuits to said multivibrator circuit to accumulate a charge during production of said pulse; a storage means discharging circuit coupled to said storage means; means coupled to said storage means and operable by the voltage thereon and coupled across a source of supply and having an output means coupled thereto whereby an output pulse is produced during discharge of said storage means and responsive to the most recent trigger signal regardless of its time of occurrence.

7. A retriggerable memory circuit comprising: a pulse producing circuit coupled to an input or trigger signals to produce pulses having a uniform amplitude and width in respone to a trigger signal; storage means coupled through coupling circuits to said pulse producing circuit to accumulate a charge during production of a pulse in said producing circuit; a storage means discharging circuit coupled to said storage means; control means coupled to said storage means and being operable by the voltage on said storage means and coupled across a source of supply and having an output means coupled thereto whereby output pulses are produced during discharge of said storage means, each said output pulse being in response to the most recently impressed trigger signal and of predetermined duration regardless of time of occurrence of said trigger signal.

8. A retriggerable memory circuit comprising: a monostable multivibrator coupled to an input for trigger signals to produce signals of uniform amplitude and width in response to trigger signals; an emitter-follower stage coupled to said multivibrator; a capacitor coupled to said emitter-follower stage for accumulating a charge through said emitter-follower; amplifier means coupled to the output of said capacitor; an output coupled to said amplifier means whereby a pulse is produced at said output during discharge of said capacitor.

9. A retriggerable memory circuit comprising: input means for trigger signals; a monostable emitter coupled multivibrator having a pair of transistors with their emitter-collector paths coupled across a source of supply and having the base of one of said transistors coupled to said input means; an emitter-follower stage capacitively coupled to said multivibrator; a transistor amplifier coupled across said source of supply and having its base coupled through a capacitor to said emitter-follower; a resistance coupled to the source of supply and to said capacitor; and output means coupled to said transistor amplifier whereby pulses having uniform duration are produced in response to said trigger signals.

10. A retriggerable memory circuit comprising: input means for trigger signals; a monostable emitter coupled multivibrator having a pair of transistors with their emitter-collector paths coupled across a source of supply and having the base of one of said transistors coupled to said input means said multivibrator providing a source of pulses of uniform amplitude and width; an emitter-follower stage capacitively coupled to said multivibrator; a transistor amplifier amplifier coupled across said source of supply and having its base coupled through a capacitor to said emitter-follower, said emitter-follower and said amplifier being operable to provide a charging circuit for said capacitor; a resistance coupled to the source of supply and to said capacitor and operable to provide a discharge path for said capacitor; and output means coupled to said amplifier whereby the charge and discharge of said capacitor produce output pulses of duration independent of time of said trigger pulses.

11. A retriggerable memory circuit comprising: input means for trigger signals; a monostable multivibrator having a pair of transistors with their emitter-collector paths coupled across a source of supply and having the base of one of said transistors coupled to said input means said multivibrator providing a source of pulses of uniform amplitude and width in response to trigger signals; an emitter-follower transistor stage capacitively coupled to said multivibrator; a fourth transistor coupled across said source of supply and having its base coupled through a capacitor to said emitter-follower; a resistance coupled to the source of supply and to said capacitor; and output means coupled to said fourth transistor, whereby presence of a pulse from said multivibrator produces charging of said capacitor through said emitter-follower and subsequent absence of a pulse from said multivibrator initiates discharge of said capacitor causing cutoff of said fourth transistor producing a pulse on said output means having duration substantially predetermined by said capacitor and resistance.

References Cited in the file of this patent

UNITED STATES PATENTS

| | | |
|---|---|---|
| 2,837,663 | Walz | June 3, 1958 |
| 2,935,698 | Adams | May 3, 1960 |
| 2,949,547 | Zimmermann | Aug. 16, 1960 |